(12) United States Patent
Pepe et al.

(10) Patent No.: US 9,995,883 B2
(45) Date of Patent: Jun. 12, 2018

(54) OPTICAL ADAPTER MODULE WITH MANAGED CONNECTIVITY

(71) Applicant: CommScope Technologies LLC, Hickory, NC (US)

(72) Inventors: Paul John Pepe, Clemmons, NC (US); Joseph Coffey, Burnsville, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days. days.

(21) Appl. No.: 15/354,739

(22) Filed: Nov. 17, 2016

(65) Prior Publication Data

US 2017/0254960 A1 Sep. 7, 2017

Related U.S. Application Data

(63) Continuation of application No. 14/669,166, filed on Mar. 26, 2015, now Pat. No. 9,500,814.
(Continued)

(51) Int. Cl.
*G02B 6/38* (2006.01)
*H01R 12/71* (2011.01)
(Continued)

(52) U.S. Cl.
CPC ......... *G02B 6/3825* (2013.01); *G02B 6/3817* (2013.01); *G02B 6/3879* (2013.01);
(Continued)

(58) Field of Classification Search
CPC .. G02B 6/3825; G02B 6/3817; G02B 6/3879; G02B 6/3895; H01R 12/7076;
(Continued)

(56) References Cited

U.S. PATENT DOCUMENTS 2,078,357 A * 4/1937 Woodmansee ........... G11B 5/00
242/324.3
3,243,761 A 3/1966 Piorunneck
(Continued)

FOREIGN PATENT DOCUMENTS

CA 2499803 4/2004
CN 101968558 A 2/2011
(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
(Continued)

*Primary Examiner* — Peter Radkowski
(74) *Attorney, Agent, or Firm* — Merchant & Gould P.C.

(57) ABSTRACT

A connection module includes a module body and a module circuit board arrangement. The module body defines a first port and an open first end providing access to the first port. The module circuit board arrangement extends across the open first end within a peripheral boundary defined by the module body. The module circuit board arrangement includes at least a first contact set that extends into the first port of the module body; an electronic controller that is electrically connected to the first contact set; and a circuit board connector facing outwardly from the module board arrangement. Example connection modules include optical adapters and electrical jacks.

20 Claims, 13 Drawing Sheets

Related U.S. Application Data

(60) Provisional application No. 61/970,410, filed on Mar. 26, 2014.

(51) Int. Cl.
*H04Q 1/02* (2006.01)
*H01R 12/70* (2011.01)
*H01R 12/73* (2011.01)

(52) U.S. Cl.
CPC ....... *G02B 6/3895* (2013.01); *H01R 12/7076* (2013.01); *H01R 12/716* (2013.01); *H04Q 1/136* (2013.01); *H01R 12/718* (2013.01); *H01R 12/73* (2013.01)

(58) Field of Classification Search
CPC .... H01R 12/716; H01R 12/718; H01R 12/73; H04Q 1/136
See application file for complete search history.

(56) References Cited

U.S. PATENT DOCUMENTS

| | | | |
|---|---|---|---|
| RE26,692 E | 10/1969 | Ruehlemann | |
| 3,954,320 A | 5/1976 | Hardesty | |
| 4,127,317 A | 11/1978 | Tyree | |
| 4,632,335 A * | 12/1986 | Dickson | G11B 23/285 235/435 |
| 4,737,120 A | 4/1988 | Grabbe et al. | |
| 4,814,911 A * | 3/1989 | Naoi | G11B 15/67557 360/85 |
| 4,953,194 A | 8/1990 | Hansen et al. | |
| 4,968,929 A | 11/1990 | Hauck et al. | |
| 5,041,005 A | 8/1991 | McHugh | |
| 5,052,940 A | 10/1991 | Bengal | |
| 5,064,381 A | 11/1991 | Lin | |
| 5,107,532 A | 4/1992 | Hansen et al. | |
| 5,161,988 A | 11/1992 | Krupka | |
| 5,166,970 A | 11/1992 | Ward | |
| 5,199,895 A | 4/1993 | Chang | |
| 5,222,164 A | 6/1993 | Bass, Sr. et al. | |
| 5,265,181 A * | 11/1993 | Chang | G02B 6/3831 385/139 |
| 5,265,187 A | 11/1993 | Morin et al. | |
| 5,305,405 A | 4/1994 | Emmons et al. | |
| 5,353,367 A | 10/1994 | Czosnowski et al. | |
| 5,393,249 A | 2/1995 | Morgenstern et al. | |
| 5,394,503 A | 2/1995 | Dietz, Jr. et al. | |
| 5,413,494 A | 5/1995 | Dewey et al. | |
| 5,418,334 A | 5/1995 | Williams | |
| 5,419,717 A | 5/1995 | Abendschein et al. | |
| 5,448,675 A | 9/1995 | Leone et al. | |
| 5,467,062 A | 11/1995 | Burroughs et al. | |
| 5,470,251 A | 11/1995 | Sano | |
| 5,473,715 A | 12/1995 | Schofield et al. | |
| 5,483,467 A | 1/1996 | Krupka et al. | |
| 5,579,425 A | 11/1996 | Lampert et al. | |
| 5,674,085 A | 10/1997 | Davis et al. | |
| 5,685,741 A | 11/1997 | Dewey et al. | |
| 5,712,942 A | 1/1998 | Jennings et al. | |
| 5,800,192 A | 9/1998 | David et al. | |
| 5,821,510 A * | 10/1998 | Cohen | G02B 6/3807 235/375 |
| 5,854,824 A | 12/1998 | Bengal et al. | |
| 5,871,368 A | 2/1999 | Erdner et al. | |
| 5,910,776 A * | 6/1999 | Black | G01S 13/74 307/140 |
| 6,002,331 A | 12/1999 | Laor | |
| 6,095,837 A | 8/2000 | David et al. | |
| 6,095,851 A | 8/2000 | Laity et al. | |
| 6,116,961 A | 9/2000 | Henneberger et al. | |
| 6,222,908 B1 | 4/2001 | Bartolutti et al. | |
| 6,222,975 B1 | 4/2001 | Gilbert et al. | |
| 6,227,911 B1 | 5/2001 | Boutros et al. | |
| 6,234,830 B1 | 5/2001 | Ensz et al. | |
| 6,238,235 B1 | 5/2001 | Shavit et al. | |
| 6,280,231 B1 | 8/2001 | Nicholls | |
| 6,285,293 B1 | 9/2001 | German et al. | |
| 6,300,877 B1 | 10/2001 | Schannach et al. | |
| 6,330,148 B1 | 12/2001 | Won et al. | |
| 6,330,307 B1 | 12/2001 | Bloch et al. | |
| 6,350,148 B1 | 2/2002 | Bartolutti et al. | |
| 6,364,694 B1 | 4/2002 | Lien | |
| 6,409,392 B1 | 6/2002 | Lampert et al. | |
| 6,421,322 B1 | 7/2002 | Koziy et al. | |
| 6,422,895 B1 | 7/2002 | Lien | |
| 6,424,710 B1 | 7/2002 | Bartolutti et al. | |
| 6,437,894 B1 | 8/2002 | Gilbert et al. | |
| 6,456,768 B1 | 9/2002 | Boncek et al. | |
| D466,479 S | 12/2002 | Pein et al. | |
| 6,499,861 B1 | 12/2002 | German et al. | |
| 6,511,231 B2 | 1/2003 | Lampert et al. | |
| 6,522,737 B1 | 2/2003 | Bartolutti et al. | |
| 6,554,484 B2 | 4/2003 | Lampert | |
| 6,574,586 B1 | 6/2003 | David et al. | |
| 6,612,856 B1 | 9/2003 | McCormack | |
| 6,626,697 B1 | 9/2003 | Martin et al. | |
| 6,636,152 B2 | 10/2003 | Schannach et al. | |
| 6,684,179 B1 | 1/2004 | David | |
| 6,725,177 B2 | 4/2004 | David et al. | |
| 6,743,044 B2 | 6/2004 | Musolf et al. | |
| 6,784,802 B1 * | 8/2004 | Stanescu | G01R 31/045 340/572.1 |
| 6,793,408 B2 | 9/2004 | Levy et al. | |
| 6,802,735 B2 | 10/2004 | Pepe et al. | |
| 6,808,116 B1 * | 10/2004 | Eslambolchi | G01S 13/825 235/375 |
| 6,811,446 B1 | 11/2004 | Chang | |
| 6,814,624 B2 | 11/2004 | Clark et al. | |
| 6,847,856 B1 * | 1/2005 | Bohannon | G06K 17/0029 340/539.13 |
| 6,850,685 B2 | 2/2005 | Tinucci et al. | |
| 6,898,368 B2 | 5/2005 | Colombo et al. | |
| 6,905,363 B2 | 6/2005 | Musolf et al. | |
| 6,932,517 B2 | 8/2005 | Swayze et al. | |
| D510,068 S | 9/2005 | Haggay et al. | |
| 6,939,168 B2 | 9/2005 | Oleynick et al. | |
| 6,961,675 B2 | 11/2005 | David | |
| 6,971,895 B2 | 12/2005 | Sago et al. | |
| 6,976,867 B2 | 12/2005 | Navarro et al. | |
| 7,046,899 B2 * | 5/2006 | Colombo | G02B 6/4452 385/135 |
| 7,077,710 B2 | 7/2006 | Haggay et al. | |
| 7,081,808 B2 | 7/2006 | Colombo et al. | |
| 7,088,880 B2 | 8/2006 | Gershman | |
| 7,112,090 B2 | 9/2006 | Caveney et al. | |
| 7,123,810 B2 | 10/2006 | Parrish | |
| 7,153,142 B2 | 12/2006 | Shifris et al. | |
| 7,165,728 B2 | 1/2007 | Durrant et al. | |
| 7,193,422 B2 | 3/2007 | Velleca et al. | |
| 7,207,819 B2 | 4/2007 | Chen | |
| 7,210,858 B2 | 5/2007 | Sago et al. | |
| 7,226,217 B1 | 6/2007 | Benton et al. | |
| 7,234,944 B2 | 6/2007 | Nordin et al. | |
| 7,241,157 B2 | 7/2007 | Zhuang et al. | |
| 7,297,018 B2 | 11/2007 | Caveney et al. | |
| 7,300,214 B2 | 11/2007 | Doo et al. | |
| 7,312,715 B2 | 12/2007 | Shalts et al. | |
| D559,186 S | 1/2008 | Kelmer | |
| 7,315,224 B2 | 1/2008 | Gurovich et al. | |
| 7,352,289 B1 | 4/2008 | Harris | |
| 7,354,202 B1 * | 4/2008 | Luger | G02B 6/3887 385/77 |
| 7,356,208 B2 | 4/2008 | Becker | |
| 7,370,106 B2 | 5/2008 | Caveney | |
| 7,384,300 B1 | 6/2008 | Salgado et al. | |
| 7,396,245 B2 | 7/2008 | Huang et al. | |
| 7,420,766 B2 * | 9/2008 | Oh | G11B 15/44 360/85 |
| 7,458,517 B2 | 12/2008 | Durrant et al. | |
| 7,468,669 B1 * | 12/2008 | Beck | H04Q 1/138 235/375 |
| 7,479,032 B2 | 1/2009 | Hoath et al. | |
| 7,490,996 B2 | 2/2009 | Sommer | |

(56) References Cited

U.S. PATENT DOCUMENTS

| | | | |
|---|---|---|---|
| 7,497,709 B1 | 3/2009 | Zhang | |
| 7,519,000 B2 | 4/2009 | Caveney et al. | |
| 7,534,137 B2 | 5/2009 | Caveney et al. | |
| 7,547,150 B2 * | 6/2009 | Downie | G02B 6/42 340/10.1 |
| 7,552,872 B2 | 6/2009 | Tokita et al. | |
| 7,563,116 B2 | 7/2009 | Wang | |
| 7,570,861 B2 | 8/2009 | Smrha et al. | |
| 7,575,454 B1 | 8/2009 | Aoki et al. | |
| 7,588,470 B2 | 9/2009 | Li et al. | |
| 7,591,667 B2 | 9/2009 | Gateau Navarro et al. | |
| 7,605,707 B2 * | 10/2009 | German | H01R 13/465 340/572.7 |
| 7,607,926 B2 | 10/2009 | Wang | |
| 7,635,280 B1 | 12/2009 | Crumlin et al. | |
| 7,648,377 B2 | 1/2010 | Naito et al. | |
| 7,682,174 B2 | 3/2010 | Chen | |
| 7,722,370 B2 | 5/2010 | Chin | |
| 7,727,026 B2 | 6/2010 | Qin et al. | |
| 7,760,094 B1 * | 7/2010 | Kozischek | H04L 12/66 340/10.51 |
| 7,772,975 B2 * | 8/2010 | Downie | G02B 6/3825 340/10.1 |
| 7,782,202 B2 * | 8/2010 | Downie | G02B 6/3895 340/10.1 |
| 7,785,154 B2 | 8/2010 | Peng | |
| 7,798,832 B2 | 9/2010 | Qin et al. | |
| 7,811,119 B2 | 10/2010 | Caveney et al. | |
| 7,814,240 B2 | 10/2010 | Salgado et al. | |
| 7,855,697 B2 * | 12/2010 | Chamarti | G06K 19/07749 343/700 MS |
| 7,856,166 B2 * | 12/2010 | Biribuze | G02B 6/4452 385/134 |
| 7,867,017 B1 | 1/2011 | Chen | |
| 7,869,426 B2 | 1/2011 | Hough et al. | |
| 7,872,738 B2 | 1/2011 | Abbott | |
| 7,880,475 B2 | 2/2011 | Crumlin et al. | |
| 7,934,022 B2 | 4/2011 | Velleca et al. | |
| 7,965,186 B2 * | 6/2011 | Downie | G02B 6/38 235/375 |
| 8,075,348 B2 * | 12/2011 | Mei | H01R 31/005 439/676 |
| 8,092,249 B2 * | 1/2012 | German | H04Q 1/138 439/489 |
| 8,116,434 B2 * | 2/2012 | German | H01R 13/6683 379/32.01 |
| 8,138,925 B2 * | 3/2012 | Downie | G06K 5/02 340/10.1 |
| 8,157,582 B2 | 4/2012 | Frey et al. | |
| 8,172,468 B2 * | 5/2012 | Jones | G02B 6/3879 340/10.1 |
| 8,181,229 B2 * | 5/2012 | Macauley | H04Q 1/138 340/572.7 |
| 8,203,450 B2 * | 6/2012 | German | G02B 6/3895 340/10.1 |
| 8,207,906 B2 * | 6/2012 | Tiscareno | H01Q 1/242 343/906 |
| 8,248,208 B2 * | 8/2012 | Renfro, Jr. | H04B 5/02 340/10.1 |
| 8,264,366 B2 * | 9/2012 | Chamarti | G01D 21/00 340/10.42 |
| 8,282,425 B2 | 10/2012 | Bopp et al. | |
| 8,287,316 B2 | 10/2012 | Pepe et al. | |
| 8,333,518 B2 * | 12/2012 | Jones | G02B 6/3879 340/10.1 |
| 8,410,909 B2 * | 4/2013 | de Jong | G02B 6/3895 340/10.4 |
| 8,690,593 B2 | 4/2014 | Anderson et al. | |
| 9,380,358 B2 * | 6/2016 | Caveney | H04Q 1/138 |
| 9,500,814 B2 | 11/2016 | Pepe et al. | |
| 2002/0008613 A1 | 1/2002 | Nathan et al. | |
| 2002/0081076 A1 | 6/2002 | Lampert et al. | |
| 2002/0116813 A1 * | 8/2002 | Scott | G02B 6/4219 29/606 |
| 2002/0117571 A1 * | 8/2002 | Scott | G02B 6/4453 242/388 |
| 2003/0031423 A1 | 2/2003 | Zimmel | |
| 2004/0052471 A1 | 3/2004 | Colombo et al. | |
| 2004/0052498 A1 | 3/2004 | Colombo et al. | |
| 2004/0117515 A1 | 6/2004 | Sago et al. | |
| 2004/0184706 A1 | 9/2004 | Koreeda et al. | |
| 2004/0240807 A1 | 12/2004 | Frohlich et al. | |
| 2005/0215119 A1 * | 9/2005 | Kaneko | G06K 7/10178 439/607.01 |
| 2005/0249477 A1 | 11/2005 | Parrish | |
| 2006/0146438 A1 * | 7/2006 | Oh | G11B 15/44 360/85 |
| 2006/0160395 A1 | 7/2006 | Macauley et al. | |
| 2006/0193591 A1 | 8/2006 | Rapp et al. | |
| 2006/0228086 A1 | 10/2006 | Holmberg et al. | |
| 2007/0116411 A1 | 5/2007 | Benton et al. | |
| 2007/0237470 A1 | 10/2007 | Aronson et al. | |
| 2007/0254529 A1 | 11/2007 | Pepe et al. | |
| 2008/0090450 A1 | 4/2008 | Harano et al. | |
| 2008/0090454 A1 | 4/2008 | Hoath et al. | |
| 2008/0100456 A1 | 5/2008 | Downie et al. | |
| 2008/0100467 A1 | 5/2008 | Downie et al. | |
| 2008/0175532 A1 | 7/2008 | Ruckstuhl et al. | |
| 2008/0175550 A1 | 7/2008 | Coburn et al. | |
| 2008/0292261 A1 * | 11/2008 | Kowalczyk | G02B 6/3897 385/135 |
| 2009/0034911 A1 | 2/2009 | Murano | |
| 2009/0097846 A1 | 4/2009 | Kozischek et al. | |
| 2009/0148106 A1 | 6/2009 | Moore et al. | |
| 2009/0148108 A1 | 6/2009 | Fukutomi | |
| 2009/0166404 A1 * | 7/2009 | German | G02B 6/3895 235/375 |
| 2009/0215310 A1 | 8/2009 | Hoath et al. | |
| 2009/0232455 A1 | 9/2009 | Nhep | |
| 2009/0325396 A1 | 12/2009 | Takeuchi | |
| 2010/0048064 A1 | 2/2010 | Peng | |
| 2010/0054685 A1 * | 3/2010 | Cooke | G02B 6/4455 385/135 |
| 2010/0079248 A1 * | 4/2010 | Greveling | G02B 6/3879 340/10.1 |
| 2010/0210135 A1 * | 8/2010 | German | H04Q 1/138 439/491 |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2010/0245057 A1 * | 9/2010 | Chamarti | G01D 21/00 340/10.42 |
| 2010/0303420 A1 * | 12/2010 | Lin | G02B 6/32 385/74 |
| 2010/0303421 A1 | 12/2010 | He et al. | |
| 2011/0043371 A1 | 2/2011 | German et al. | |
| 2011/0092100 A1 | 4/2011 | Coffey et al. | |
| 2011/0115494 A1 | 5/2011 | Taylor et al. | |
| 2011/0116748 A1 | 5/2011 | Smrha et al. | |
| 2011/0129185 A1 * | 6/2011 | Lewallen | G02B 6/3825 385/53 |
| 2011/0129186 A1 * | 6/2011 | Lewallen | G02B 6/3825 385/59 |
| 2011/0222819 A1 | 9/2011 | Anderson et al. | |
| 2011/0228473 A1 | 9/2011 | Anderson et al. | |
| 2011/0235979 A1 | 9/2011 | Anderson et al. | |
| 2011/0243505 A1 | 10/2011 | Su et al. | |
| 2011/0255829 A1 | 10/2011 | Anderson et al. | |
| 2011/0262077 A1 | 10/2011 | Anderson et al. | |
| 2011/0274437 A1 * | 11/2011 | Jones | G02B 6/3895 398/141 |
| 2012/0003877 A1 | 1/2012 | Bareel et al. | |
| 2012/0007717 A1 * | 1/2012 | Jong | G02B 6/3895 340/10.4 |
| 2012/0021636 A1 | 1/2012 | Debendictis et al. | |
| 2012/0039569 A1 | 2/2012 | Kevern et al. | |
| 2012/0088412 A1 | 4/2012 | Mattson et al. | |
| 2012/0168521 A1 * | 7/2012 | Jones | G02B 6/3895 235/492 |

(56) References Cited

U.S. PATENT DOCUMENTS

| | | | |
|---|---|---|---|
| 2012/0208401 A1 | 8/2012 | Petersen | |
| 2012/0234778 A1 | 9/2012 | Anderson et al. | |
| 2013/0039624 A1* | 2/2013 | Scherer | H01R 9/032 385/92 |
| 2013/0076589 A1* | 3/2013 | Caveney | H04Q 1/138 343/906 |
| 2013/0084041 A1 | 4/2013 | Lin et al. | |
| 2013/0163937 A1 | 6/2013 | Wang et al. | |
| 2014/0038462 A1 | 2/2014 | Coffey et al. | |
| 2014/0219656 A1 | 8/2014 | Lawson et al. | |
| 2014/0286610 A1 | 9/2014 | Anderson et al. | |

FOREIGN PATENT DOCUMENTS

| | | |
|---|---|---|
| DE | 102 44 304 | 3/2004 |
| DE | 10 2004 033 940 A1 | 2/2006 |
| EP | 0 613 032 A2 | 8/1994 |
| EP | 1 199 586 A2 | 4/2002 |
| EP | 1 237 024 A1 | 9/2002 |
| EP | 1 467 232 A1 | 10/2004 |
| EP | 1 662 287 A1 | 5/2006 |
| EP | 2 957 936 A2 | 12/2015 |
| JP | 4-174406 | 6/1992 |
| WO | WO 00/65696 | 11/2000 |
| WO | WO 02/47215 A1 | 6/2002 |
| WO | WO 2007/061490 A2 | 5/2007 |
| WO | WO 2010/001400 A1 | 1/2010 |
| WO | WO 2010/081186 A1 | 7/2010 |
| WO | WO 2010/121639 A1 | 10/2010 |
| WO | WO 2013/189370 A2 | 12/2013 |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

FOCIS 10—Fiber Optic Connector Intermateability Standard—Type LC, TIA/EIA-604-10A, 38 pages (Mar. 2002).

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes*! NORDX/CDT © 2003 (6 pages).

International Search Report and Written Opinion for Application No. PCT/US2015/022810 dated Jun. 26, 2015.

iTRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

TrueNet; TFP Series Rack Mount Fiber Panels, Spec Sheet; May 2008; 8 pages.

Extended European Search Report for Application No. 15768931.6 dated Sep. 29, 2017.

* cited by examiner

OPTICAL ADAPTER MODULE WITH MANAGED CONNECTIVITY

CROSS-REFERENCE TO RELATED APPLICATIONS

This application is a continuation of application Ser. No. 14/669,166, filed Mar. 26, 2015, now U.S. Pat. No. 9,500,814, which application claims the benefit of U.S. Provisional Application No. 61/970,410, filed Mar. 26, 2014, and titled "Optical Adapter Module with Managed Connectivity," the disclosure of which is hereby incorporated herein by reference.

BACKGROUND

In communications infrastructure installations, a variety of communications devices can be used for switching, cross-connecting, and interconnecting communications signal transmission paths in a communications network. Some such communications devices are installed in one or more equipment racks, cabinets, hubs, or other frames or enclosures to permit organized, high-density installations to be achieved in limited space available for equipment.

SUMMARY

In accordance with some aspects of the disclosure, a connection module includes a module body defining a first port. The connection module also includes a module circuit board arrangement extending across an open first end of the module body. The module circuit board arrangement includes at least a first contact set that extends into the first port of the module body; and an electronic controller that is electrically connected to the first contact set. The module circuit board arrangement also includes an outwardly facing circuit board connector that mates with the circuit board connector of the system circuit board.

In some implementations, the module circuit board arrangement is contained within a peripheral boundary defined by the module body. In certain implementations, the module circuit board arrangement is at least partially recessed within the open first end of the module body. In an example, the outwardly facing circuit board connector is accessible through the open first end of the module body. In another example, the outwardly facing circuit board connector protrudes outwardly through the open first end of the module body.

In some examples, the module body forms an optical adapter that also defines a second port aligned with the first port along a common insertion axis. In an example, the module body is configured to receive optical LC connectors. In an example, the module body is configured to receive optical SC connectors. In an example, the module body is configured to receive optical MPO connectors. In other examples, the module body forms an electrical jack.

In certain examples, the module circuit board arrangement includes multiple contact sets that extend into ports of the module body. In certain examples, each contact set extends into a respective port.

In certain examples, the module circuit board arrangement also includes at least one light indicator that is electrically connected to the electronic controller. In examples, the module body defines a side opening through which light from the light indicator shines.

In some implementations, the module circuit board arrangement includes a second module circuit board that extends across an open second end of the module body opposite the open first end. The second module circuit board includes a second contact set extending into the second port of the module body. A flexible circuit extends between and electrically connects the module circuit board and the second module circuit board. In an example, the second module circuit board arrangement does not include a circuit board connector. In an example, the second module circuit board arrangement does not include an electronic controller.

In accordance with certain aspects of the disclosure, an optical adapter module includes an adapter body and an adapter circuit board arrangement. The adapter body defines first and second ports aligned along a common insertion axis. The adapter body defines an open first end bounded by a first end section of the adapter body. The open first end provides access to the first port. The adapter body defines a recessed surface within the open first end. The adapter circuit board arrangement seats on the recessed surface within the open first end of the adapter body so that side edges of the circuit board arrangement are disposed within the first end section of the adapter body. The adapter circuit board arrangement includes at least a first contact set that extends into the first port of the adapter body, an electronic controller that is electrically connected to the first contact set, and a circuit board connector facing outwardly from the circuit board arrangement.

In certain examples, the adapter body defines a further recessed surface on which the light indicator seats. In examples, the adapter body defines further recessed surfaces on which a support body of the first contact set seats. In an example, the adapter body defines an open channel in which a distal end of an extended contact member of the first contact set is disposed.

In accordance with certain aspects of the disclosure, a connection module includes a module body defining first and second ports aligned along a common insertion axis and defining an open top and an open bottom. The open top provides access to the first port and the open bottom provides access to the second port. The adapter circuit board arrangement couples to the module body. The adapter circuit board arrangement includes a first circuit board disposed at the open top of the module body, a second circuit board disposed at the open bottom of the module body, and a connection member that electrically connects the first and second circuit boards. Each of the first and second circuit boards includes at least one contact set extending into one of the ports. The first circuit board includes an electronic controller that is electrically coupled to the contact sets of the first and second circuit boards. The first circuit board also includes a circuit board connector electrically connected to the electronic controller. The circuit board connector faces away from the module body.

In an example, the connection member is disposed external of the module body.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In places herein, the terms "top," "bottom," "upwardly," "downwardly," "front," and "rear" are used for convenience. These terms are not intended to be limiting. For example, the terms do not indicate a necessary orientation for the object being described, but rather are based on the example illustrated orientation within the drawings.

In general, the disclosure relates to connection module that is configured to be installed at equipment having a system circuit board (e.g., host circuit board) with at least one circuit board connector. The connection module includes a module body defining a first port. The connection module also includes a module circuit board arrangement extending across an open first end of the module body. The module circuit board arrangement includes at least a first contact set that extends into the first port of the module body; and an electronic controller that is electrically connected to the first contact set. The module circuit board arrangement also includes an outwardly facing circuit board connector that mates with the circuit board connector of the system circuit board.

In some implementations, the system circuit board includes multiple circuit board connectors. Multiple connection modules can be installed at the system circuit board. Each connection module can include a circuit board connector that mates with one of the circuit board connectors of the system circuit board. In certain examples, the connection modules can be incrementally installed at the system circuit board. For example, one or more connection modules may be initially installed at the system circuit board while at least one circuit board connector of the system circuit board is left available. Over time, one or more connection modules can be added at the available circuit board connectors of the system circuit board.

In some implementations, the module circuit board arrangement is contained within a peripheral boundary defined by the module body. In certain implementations, the module circuit board arrangement is at least partially recessed within the open first end of the module body. In an example, the outwardly facing circuit board connector is accessible through the open first end of the module body. In another example, the outwardly facing circuit board connector protrudes outwardly through the open first end of the module body.

Figure 1:
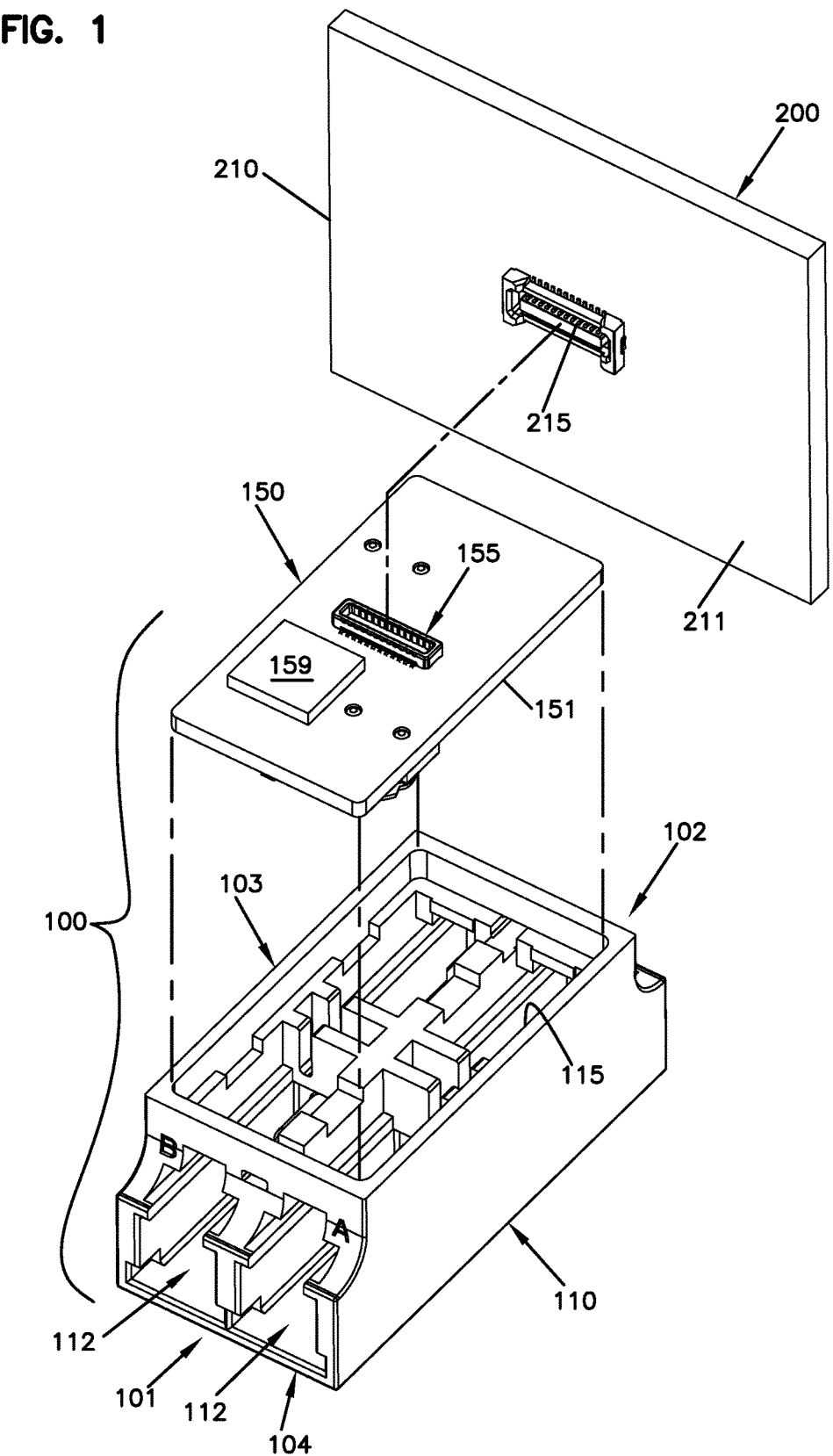
FIG. 1 is a perspective view of an example connection module with a module circuit board arrangement shown exploded from a module body and a host circuit board shown exploded and rotated away from the connection module.

FIG. 1 illustrates an example connection module 100 exploded away from a system circuit board arrangement 200. The system circuit board arrangement includes a system circuit board 210 having a first major side 211 and an opposite second major side 212. A circuit board connector 215 is disposed at the first major side 211. The system circuit board arrangement 200 is rotated in FIG. 1 so that the first major side 211 is clearly visible.

The example connection module 100 includes a module body 110 and a module circuit board arrangement 150. In the illustrated example, the connection module 100 has a front 101, a rear 102, a top 103, and a bottom 104. The module body 110 defines a first port 112 at one of the front 101 and the rear 102. In some examples, the module body 110 forms an optical adapter that defines a second port 113 aligned with the first port 112 along a common insertion axis $A_I$ to align a pair of optical plug connectors. In other examples, the module body 110 forms an electrical jack that terminates conductors to signal contacts positioned to mate with plug contacts of an electrical plug connector received at the electrical jack. In certain examples, the module body 110 defines multiple ports 112, 113 at the front 101 and/or rear 102, respectively, of the module body 110.

The module body 110 also defines an open first end 115 at one of the top 103 and the bottom 104. The open first end 115 provides access to at least the first port 112. In an example, the open first end 115 also provides access to the second port 113. In certain examples, the open first end 115 provides access to multiple front ports 112 and/or to multiple rear ports 113. In the example shown, the module body 110 defines a first port 112 at the front 101, a second port 113 at the rear 102, and an open top end 115. In other examples, however, the module body 110 may define an open bottom end instead of or in addition to the open top end 115.

The module circuit board arrangement 150 includes a circuit board 151 that extends across the open first end 115 of the module body 110. The module circuit board arrangement 150 also includes at least a first media reading interface (MRI) contact set 160 (FIG. 2) that extends into the first port 112 of the module body 110. A module controller 159 is mounted to the circuit board 151 and electrically connected to the first MRI contact set 160. The module circuit board arrangement 150 also includes an outwardly facing circuit board connector 155 that mates with a circuit board connector 215 of a system circuit board 210.

In an example, the module controller 159 is configured to obtain information from an electronic memory device of a plug connector received at the first port 112 via the first MRI contact set 160. In another example, the module controller 159 is configured to write information to the electronic memory device of the plug connector received at the first port 112. In certain examples, the circuit board arrangement 150 includes multiple MRI contact sets 160 and the module controller 159 is configured to obtain information from electronic memory devices plug connectors received at the module body 110 via the MRI contact sets 160.

Additional information about MRI contact sets and electronic memory devices of plug connectors can be found in U.S. Publication No. 2011/0262077 and in U.S. Publication No. 2011/0115494, the disclosures of which are hereby incorporated herein by reference.

Mating the circuit board connectors of the module circuit board arrangement 150 and the system circuit board arrangement 200 connects the module controller 159 to any data network connected to the system circuit board arrangement 200. In certain examples, the system circuit board arrangement 200 includes a master controller that manages the module controllers 159 of multiple connection modules 100 installed at the system circuit board arrangement 200. In certain examples, power can be supplied to the module controller 159 via the system circuit board arrangement 200.

Figure 2:
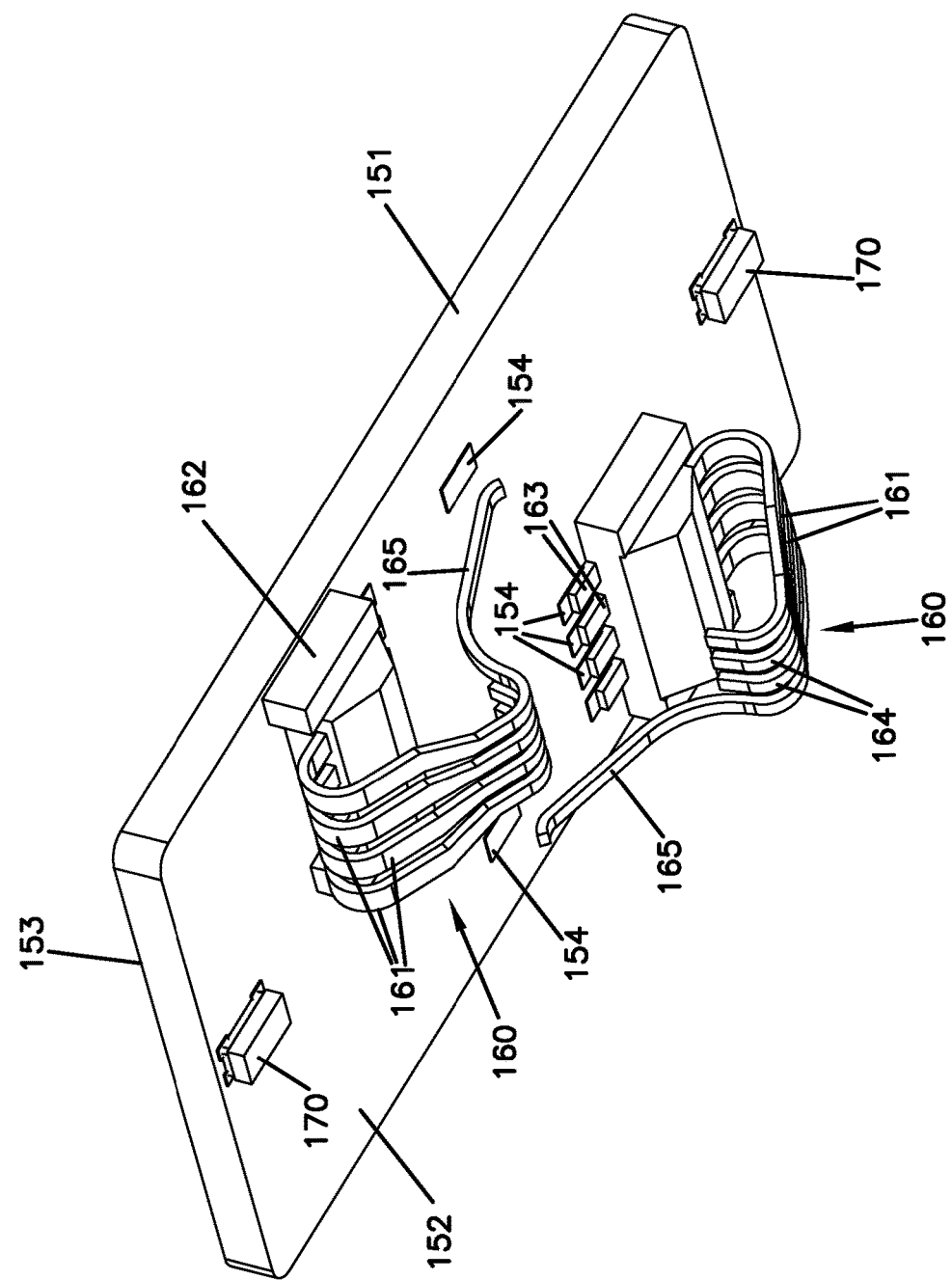
FIG. 2 is a bottom perspective view of an example module circuit board arrangement suitable for use in the connection module of FIG. 1.
Figure 3:
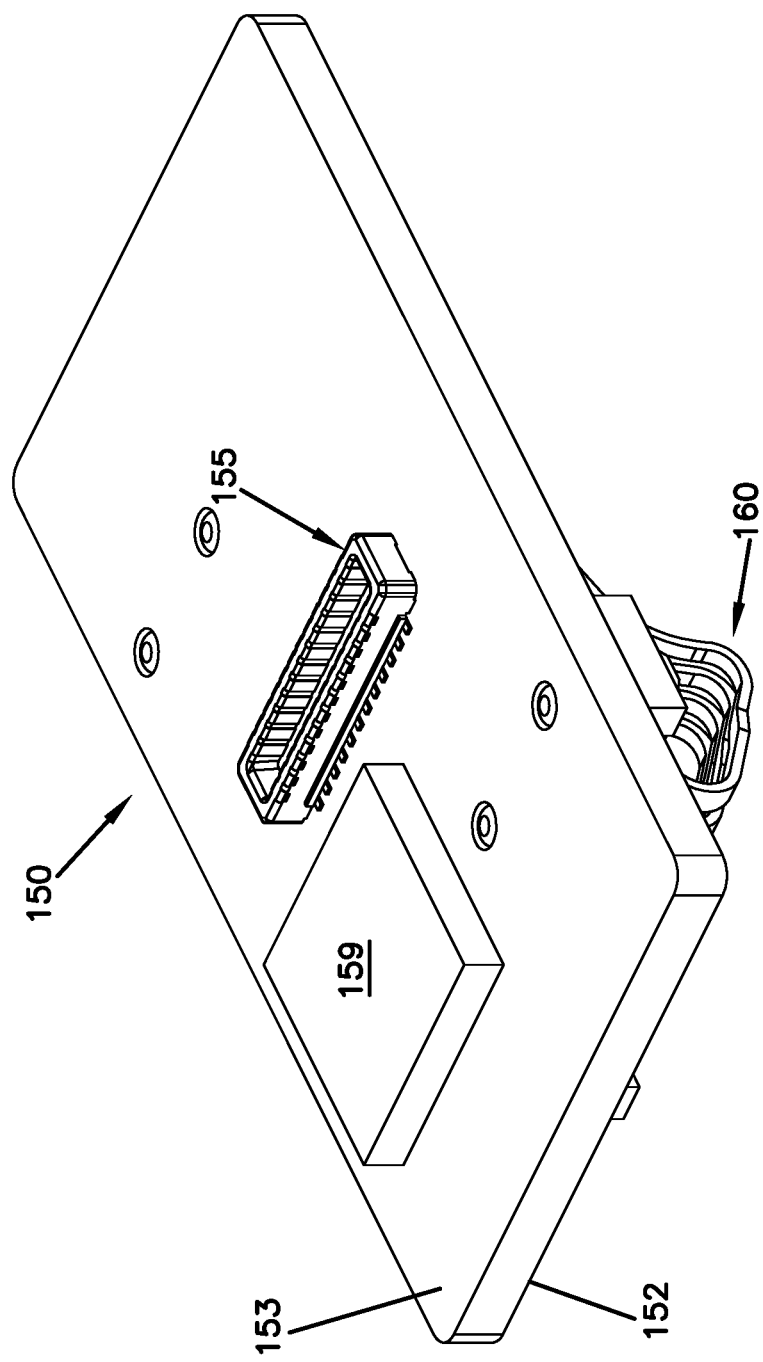
FIG. 3 is a top perspective view of the example module circuit board arrangement of FIG. 2.

FIGS. 2 and 3 illustrate one example module circuit board arrangement 150 suitable for use with a connection module 100. The module circuit board arrangement 150 includes a circuit board 151 having a first major surface 152 and an opposite second major surface 153. When the module circuit board arrangement 150 is coupled to the module body 110, the first major surface 152 faces into the module body 110 and the second major surface 153 faces away from the module body 115. At least a first MRI contact set 160 is disposed at the first major surface 152. In some implementations, a plurality of MRI contact sets 160 are disposed at the first major surface 152. In certain examples, first and second MRI contact sets 160 can be disposed at the first major surface 152.

Each MRI contact set 160 includes one or more contact members 161 that are held together by a contact set body 162 (FIG. 2). For example, the body 162 can be overmolded around the contact members 161. In certain examples, the body 162 is attached to the board 151 (e.g., using pegs and holes). First ends 163 of the contact members 161 couple (e.g., are soldered) to contact pads 154 on the first major surface 152 of the circuit board 151. Second ends 164 of the contact members 161 extend away from the circuit board 151. In certain examples, one contact member 161 of each MRI contact set 160 has an extended portion 165 that extends past the second ends of the other contact members 161. The extended portion 165 aligns with a contact pad 154 on the first major surface 152 of the circuit board 151.

A module controller 159 is disposed at the second major surface 153 of the circuit board 151. The module controller 159 is electrically connected to the MRI contact sets 160. A circuit board connector 155 also is disposed at the second major surface 153. The circuit board connector 155 is configured to mate with the circuit board connector 215 of the system circuit board 210. In certain implementations, one or more light indicators 170 are disposed at the circuit board 151. In an example, the one or more light indicators 170 are disposed at the first major surface 152. In another example, the one or more light indicators 170 are disposed at the second major surface 153. In an example, each connection module 100 includes two light indicators—one for the front 101 and one for the rear 102.

Figure 4:
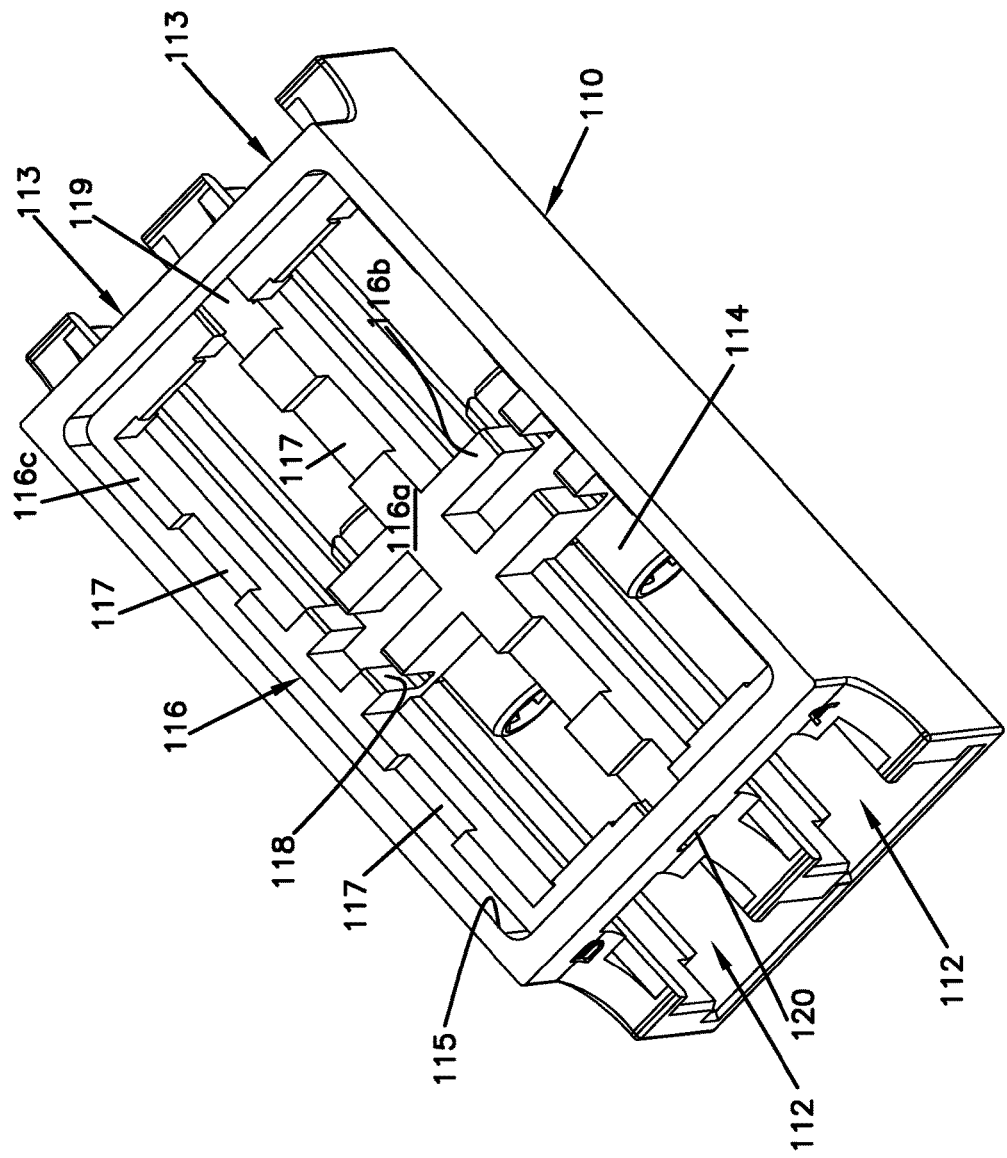
FIG. 4 is a top perspective view of an example module body suitable for use in the connection module of FIG. 1.
Figure 5:
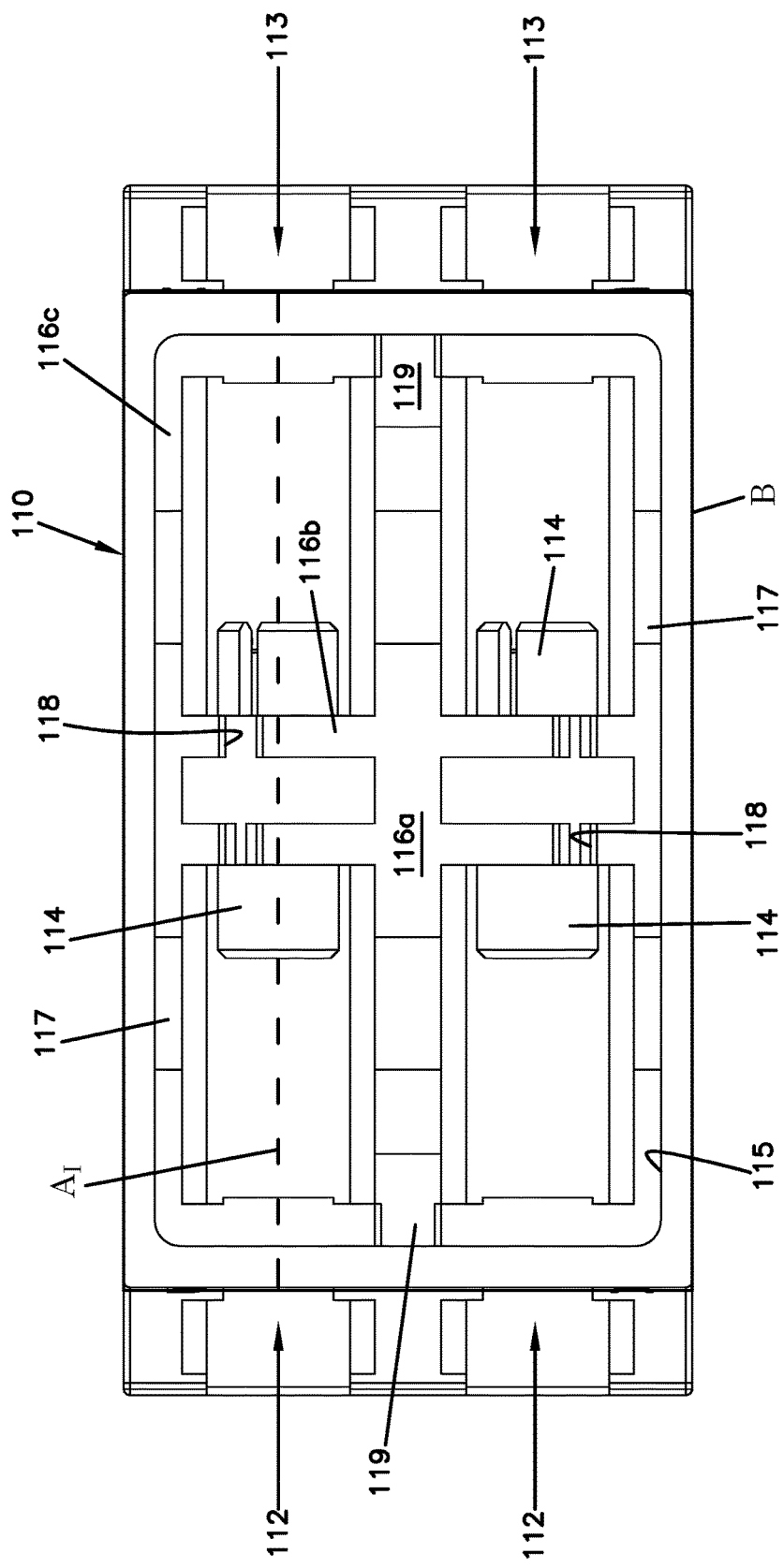
FIG. 5 is a top plan view of the example module body of FIG. 4.

FIGS. 4 and 5 illustrate one example module body 110 suitable for use in a connection module 100. In the example shown, the module body 110 defines two pairs of ports. Each pair includes a front port 112 and a rear port 113. In an example, the front ports are laterally aligned. In other examples, the module body 110 may define a greater or lesser number of port pairs. In still other examples, the module body 110 may define one or more ports at only the front 101 or only the rear 102. The example module body 110 shown includes split sleeves 114 configured to receive ferrules of axially aligned optical plug connectors to optically couple the optical plug connectors. In other examples, the module body 110 may be configured to align and optically couple ferruleless optical plug connectors.

In some implementations, the module body 110 defines a recessed surface 116 within the open first end 115. In certain examples, the recessed surface 116 extends partially across the open first end 115 without blocking external access to the first port 112 through the open first end 115. The module circuit board arrangement 150 seats on the recessed surface 116. In an example, the module circuit board arrangement 150 is recessed within the module body 110 when the module circuit board arrangement 150 seats on the recessed surface 116. In another example, the module circuit board arrangement 150 extends flush with the module body 110 when the module circuit board arrangement 150 seats on the recessed surface 116. In yet another example, the module circuit board arrangement 150 may partially protrude through the open first end 115 of the module body 110 when the module circuit board arrangement 150 seats on the recessed surface 116.

In the example shown, the recessed surface 116 has a first portion 116a that extends axially across the open first end 115 from the front 101 to the rear 102; a second portion 116b that extends laterally across the open first end 115 between the opposite sides; and a third portion 116c that extends along a periphery of the open first end 115. In other examples, the recessed portion 116 may include some combination of the portions 116a, 116b, 116c or regions thereof. For example, various examples of a module body 110 may include only the third portion 116c, only include the second portion 116b combined with front and rear regions of the third portion 116c, or only include the first portion 116a combined with side regions of the third portion 116c.

Figure 6:
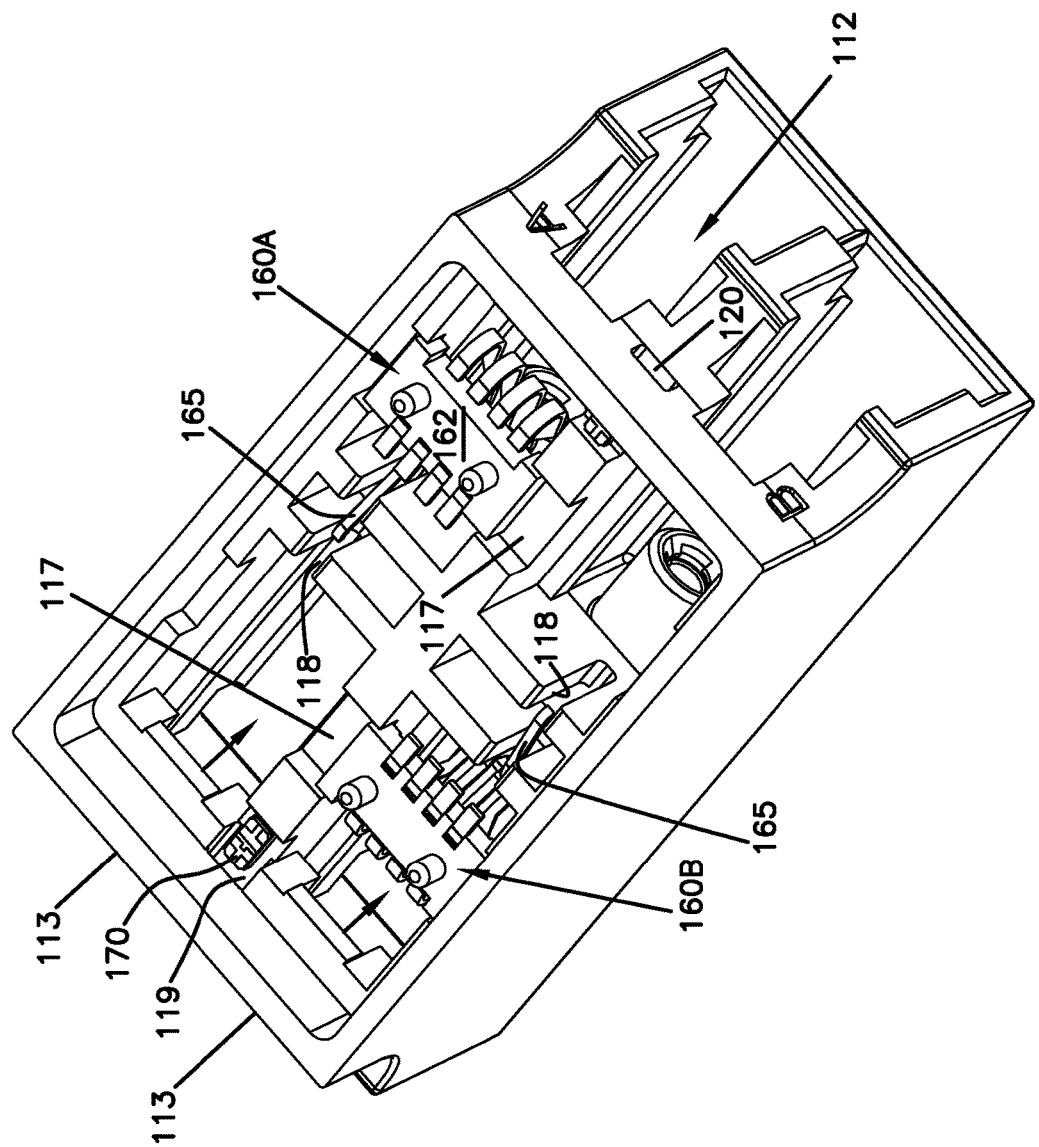
FIG. 6 is a top perspective view of an example connection module with the circuit board removed so that contact sets and light indicators are visible within the module body.

In some implementations, the recessed surface 116 defines one or more additional recesses to accommodate components mounted to the module circuit board arrangement 150. For example, in certain implementations, the recessed surface 116 may define one or more first recesses 117 to accommodate the body 162 of the MRI contact sets 160 (see FIG. 6). In certain implementations, the recessed surface 116 may define one or more second recesses 118 to accommodate deflection of the extended portions 165 of the MRI contact sets 160 (see FIG. 6). In certain implementations, the recessed surface 116 may define one or more third recesses 119 to accommodate the light indicators 170 (see FIG. 6).

In some implementations, module body 110 defines one or more openings 120 through which light from the light indicators 170 shines. For example, the module body 110 can define the openings 120 at the third recesses 119. In certain implementations, the openings 120 remain empty. In other implementations, light pipes are disposed in the openings 120 to transmit the light from the light indicators 170 external of the module body 120. In an example, the module body 110 has a first opening 120 at the front 101 and a second opening 120 at the rear 102. In such an example, the light indicator 170 at the front 101 would shine to indicate the connection module 100 or the front 101 of the connection module 100. In other examples, the module body 110 has multiple openings 120 at the front 101. In some such examples, each light indicator 170 may be associated with a particular port 112.

Figure 7:
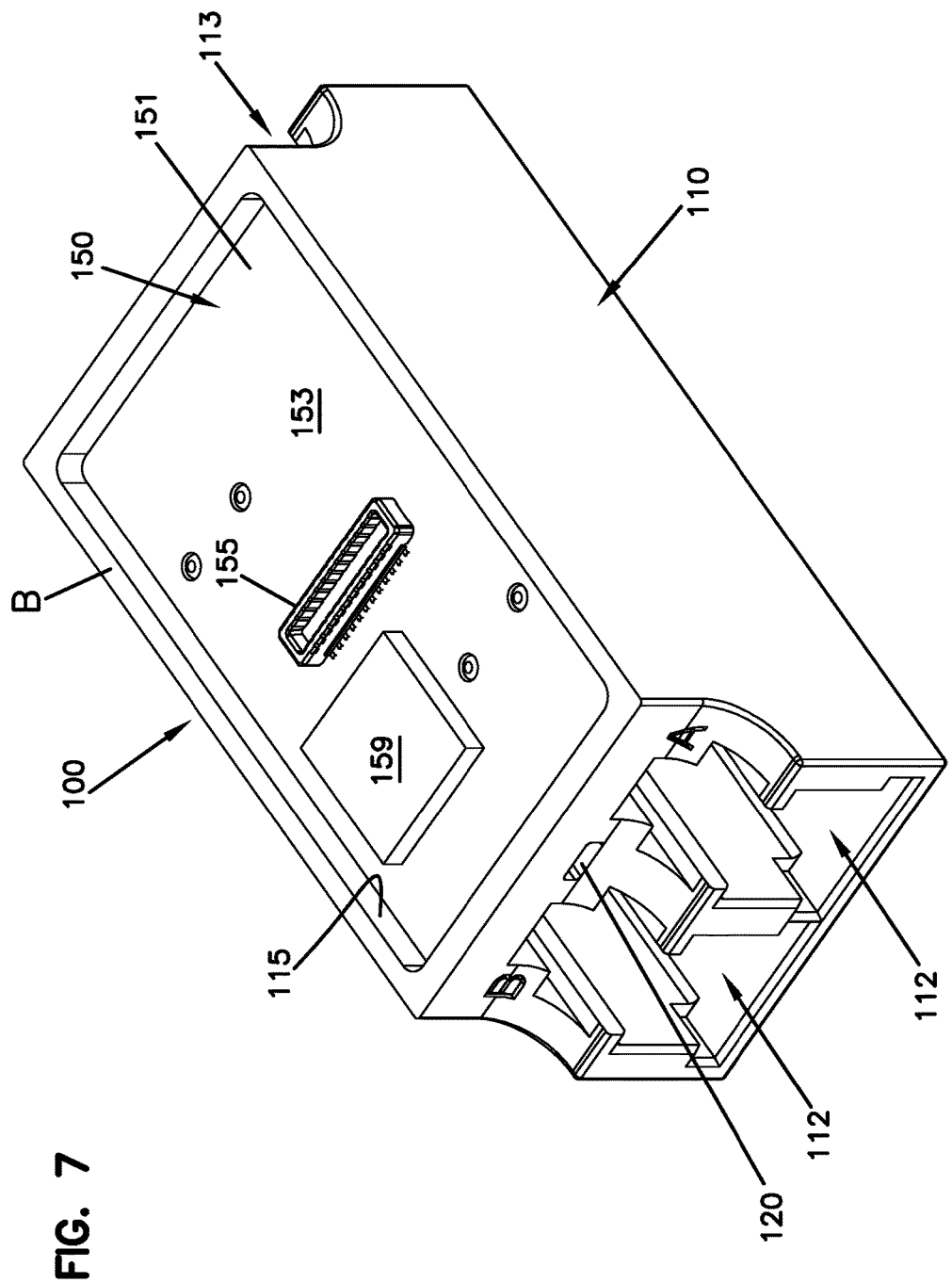
FIG. 7 is a top perspective view of the example connection module of FIG. 1 in an assembled state.
Figure 8:
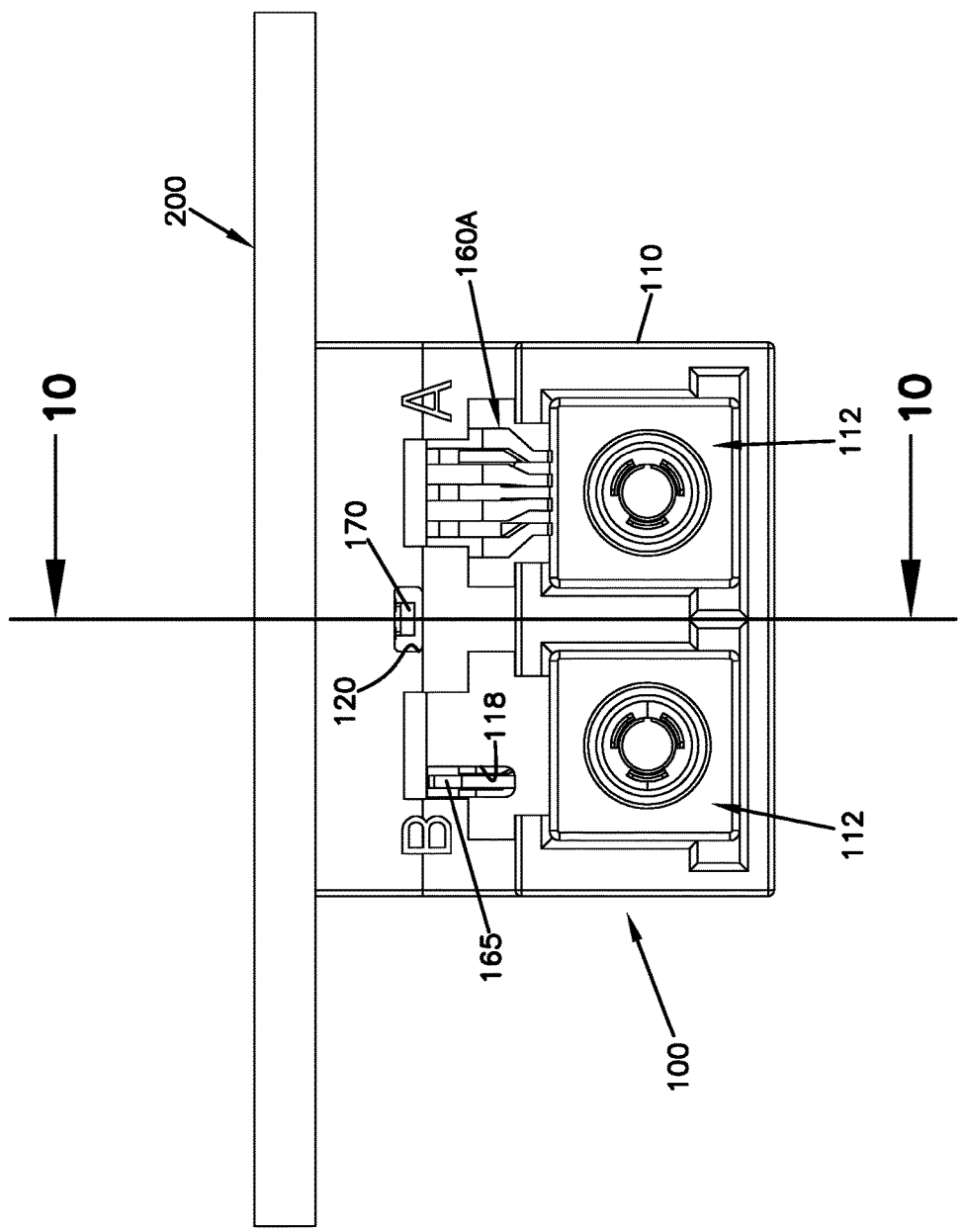
FIG. 8 is a front elevational view of the connection module of FIG. 7 connected to a host circuit board.

FIGS. 7 and 8 illustrate a module circuit board arrangement 150 mounted at the module body 110. The module circuit board arrangement 150 seats on the recessed surface 116 within the open first end 115 (see FIG. 7). The first and second MRI contact sets 160A, 160B (FIG. 6) extend into first and second ports 112, 113, respectively (see FIG. 8). In some implementations, the circuit board 151 is secured to the module body 110 (e.g., using adhesive). In other implementations, the circuit board 151 is removably attached to the module body 110 (e.g., snap-fit, friction-fit, etc.).

In some implementations, the module circuit board 151 does not extend beyond a footprint of the module body 110. In certain implementations, the module circuit board 151 is axially and laterally contained within a peripheral boundary B defined by the module body 110 (see FIG. 7). For example, the peripheral boundary B can be defined by top edges of the module body 110 that extend along the front 101, rear 102, and opposite sides of the module body 110.

In certain implementations, the module circuit board arrangement 150 is at least partially recessed within the open first end 115 of the module body 110. In certain examples, circuit board 151 is fully recessed within the open first end 115. In an example, the outwardly facing circuit board connector 155 is accessible through the open first end 115 of the module body 110. In another example, the outwardly facing circuit board connector 155 protrudes outwardly through the open first end 115 of the module body 110.

Figure 9:
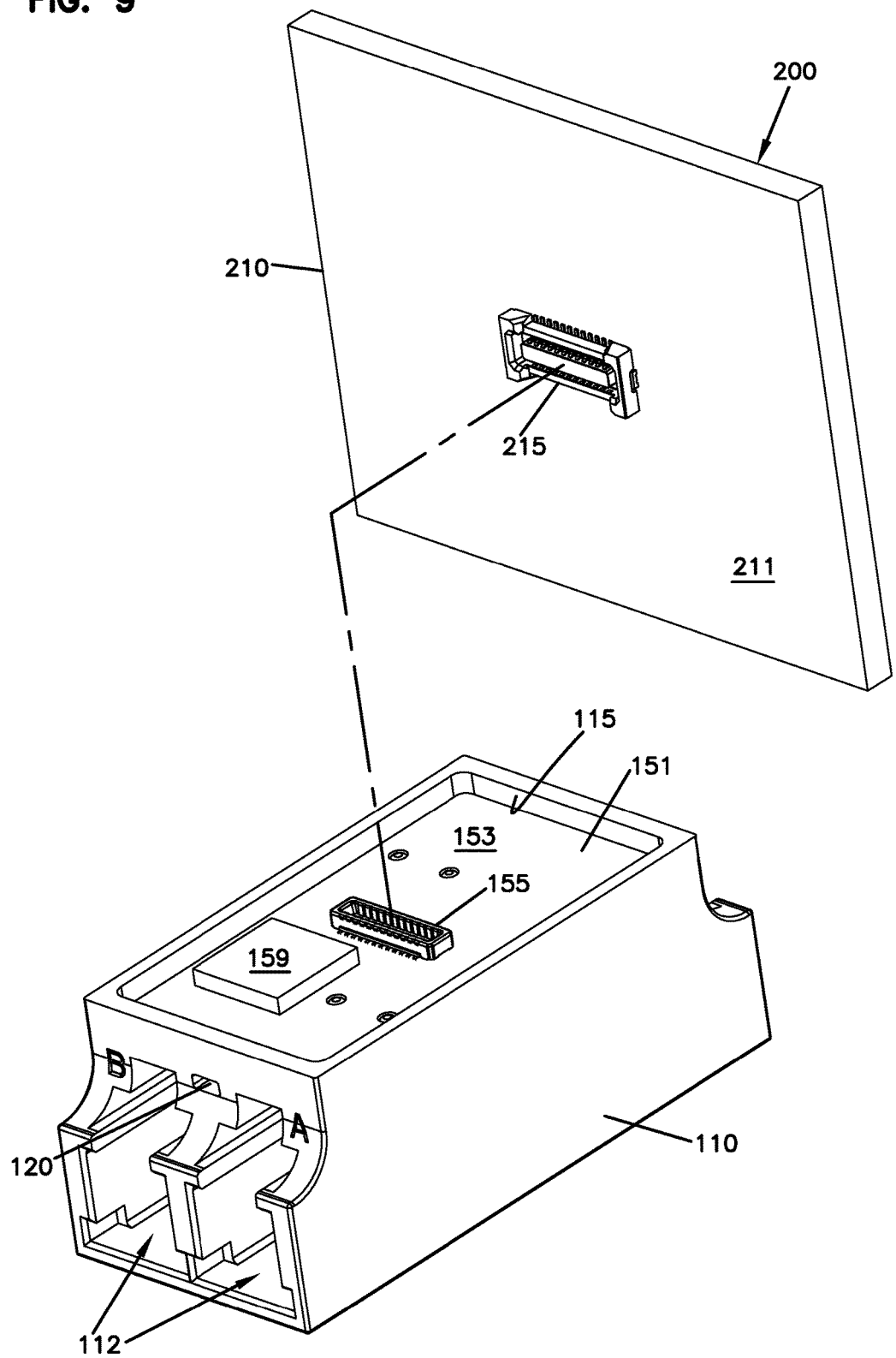
FIG. 9 shows the connection module of FIG. 7 exploded from an example host circuit board.
Figure 10:
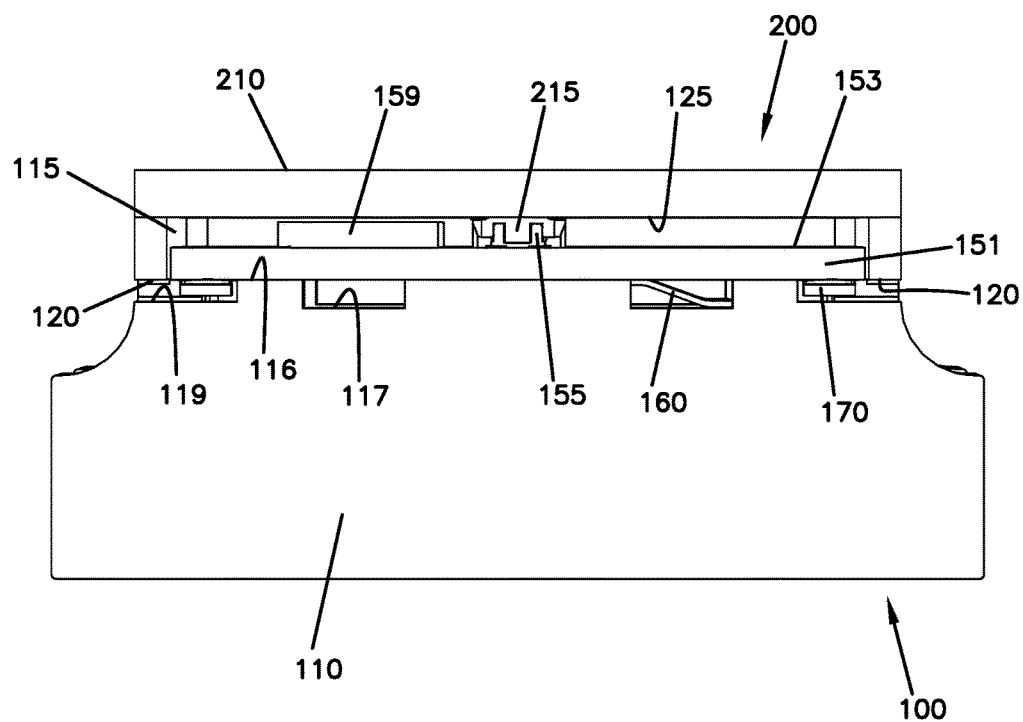
FIG. 10 is an axial cross-sectional view of the connection module of FIG. 7 taken along the 10-10 lines in FIG. 8.

FIGS. 9 and 10 illustrate mounting the connection module 100 to a system circuit board arrangement 200. The system circuit board 210 extends across top edges of the module body 110. In some implementations, the module circuit board arrangement 150 is recessed sufficiently within the open first end 115 of the module body 110 to create a chamber 125 between the second major surface 153 of the circuit board 151 and the opposing major surface of the 211 of the system circuit board 210 (see FIG. 10). The chamber 125 accommodates the module controller 159. The chamber 125 also accommodates the circuit board connectors 155, 215.

Figure 11:
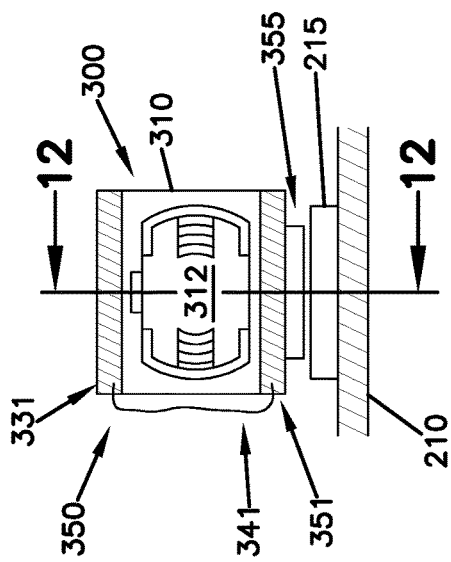
FIG. 11 is a front elevational view of another example connection module exploded away from an example host circuit board.
Figure 12:
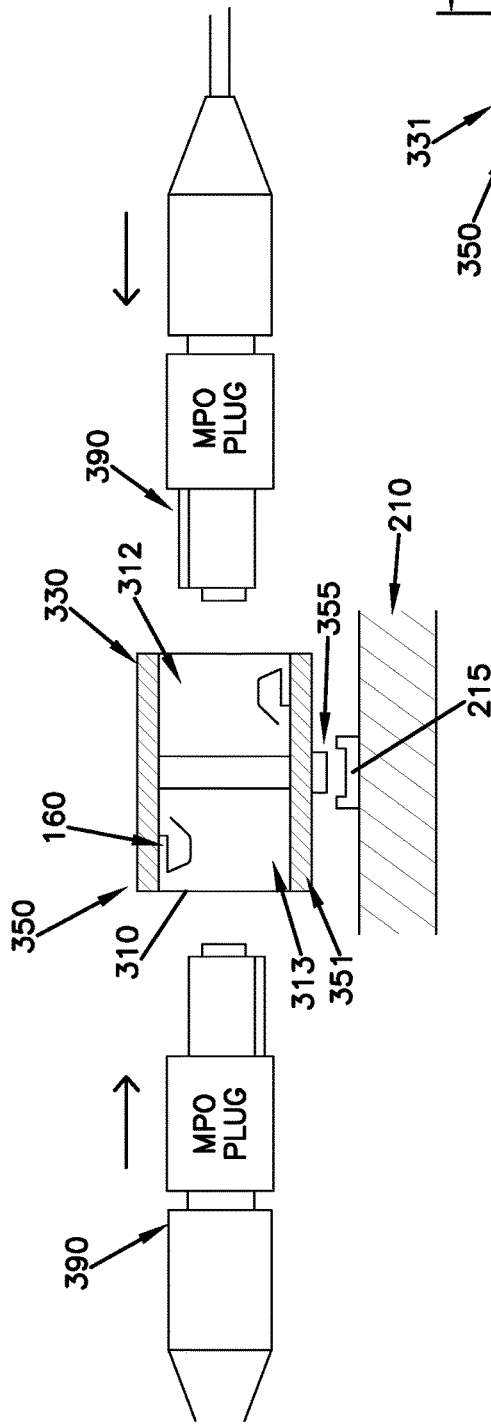
FIG. 12 is an axial cross-sectional view taken along the 12-12 lines of FIG. 11.

FIGS. 11 and 12 illustrate an alternative example connection system 300 suitable for installation at the system circuit board arrangement 200. The connection module 300 includes a module body 310 defining a first port 312 and a second port 313. A module circuit board arrangement 350 couples to the module body 310 to provide MRI contact sets 160 to the first and second ports 312, 313 of the module body 310. The module circuit board arrangement 350 includes MRI contact sets 160 extending into both ports 312, 313. In certain examples, the module body 310 defines multiple first ports 312 and multiple second ports 313 and the module circuit board arrangement 350 includes MRI contact sets 160 extending into at least one of the first ports 312 and at least one of the second ports 313.

The module circuit board arrangement 350 includes a first circuit board 351 configured to extend across a first open end of the module body 310, a second circuit board 331 configured to extend across an opposite second open end of the module body 310, and a connection member 341 electrically connecting the first and second circuit boards 351, 331. One or more MRI contact sets 160 extend from the first circuit board 351 into the one or more first ports 312. One or more MRI contact sets 160 extend from the second circuit board 331 into the one or more second ports 313.

The module controller and circuit board connector 355 are disposed at the first circuit board 351. In certain examples, the second circuit board 331 does not include an electronic controller. Rather, the module controller manages information obtained using the MRI contact sets 160 at the first circuit board 351 and the MRI contact sets 160 at the second circuit board 331. Information obtained by the MRI contact sets 160 at the second circuit board 331 is transmitted over the connection member 341 at the first circuit board 351. In certain examples, the connection member 341 includes a flexible circuit board (e.g., a rigid-flex printed circuit board assembly).

In some implementations, the first and second circuit boards 351, 331 are recessed within the module body 310. In other implementations, the first and second circuit boards 351, 331 are disposed partially exterior to the module body 310. In certain implementations, the first and second circuit boards 351, 331 are contained within peripheral boundaries of the first and second open ends of the module body 310. In an example, the connection member 341 is disposed within a sidewall of the module body 310. In another example, the connection member 341 is disposed external to the module body 310.

Figure 13:
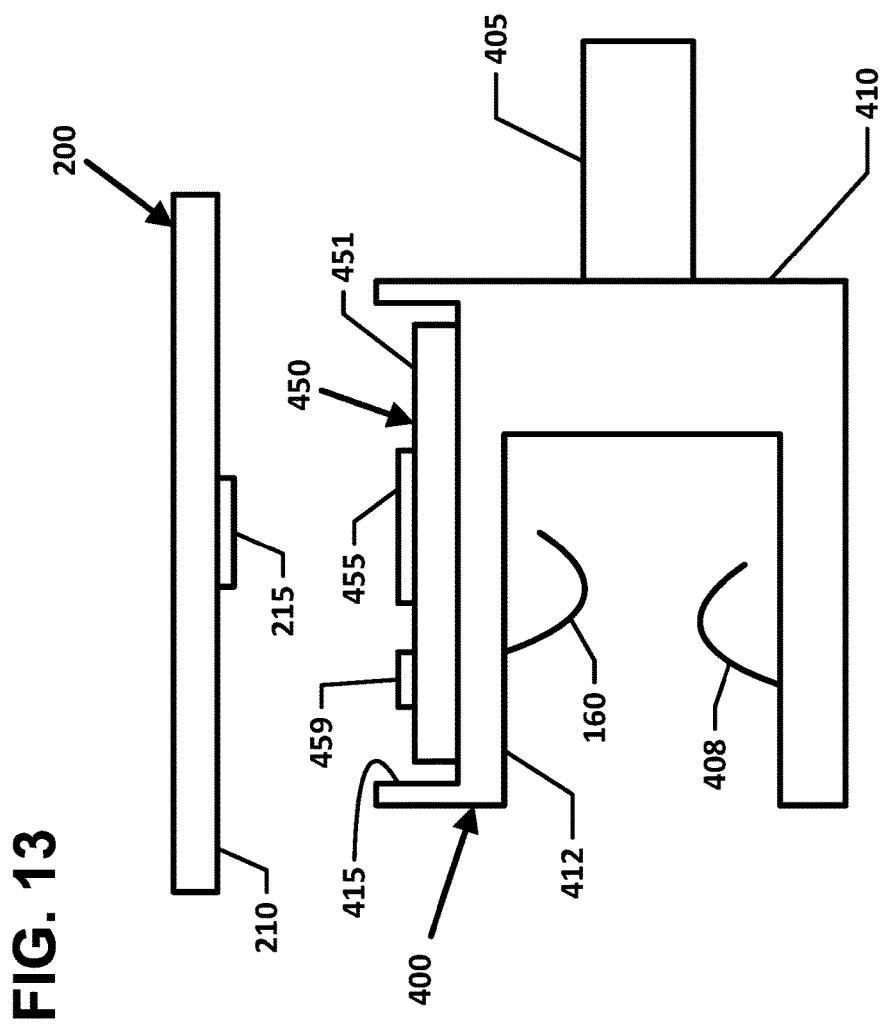
FIG. 13 is a schematic view of an example connection module defining an electrical jack.

FIG. 13 illustrates another example connection module 400 suitable for installation at the system circuit board arrangement 200. The connection module 400 includes a module body 410 defining a first port 412. A cable 405 having one or more conductors is terminated at the module body 410. Electrical contacts 408, which are electrically connected to the conductors of the cable 405, extend into the port 412. An MRI contact set 160 also extends into the port 412. In the example shown, the MRI contact set 160 is disposed at an opposite side of the port 412 from the conductor contacts 408. In other implementations, however, the contact sets 160, 408 can be disposed in any desired configuration within the port 412.

A module circuit board arrangement 450 couples to the module body 410 to provide the MRI contact set 160 to the first port 412. The module circuit board arrangement 450 includes a module controller 459 that manages information obtained using the MRI contact set 160 and a circuit board connector 455 that mates with a host circuit board connector 215 disposed on a host circuit board 210. In certain examples, the module circuit board 451 is recessed within the module body 410. In an example, the module circuit board arrangement 450 including the circuit board connector 455 is recessed within the module body 410.

Figure 14:
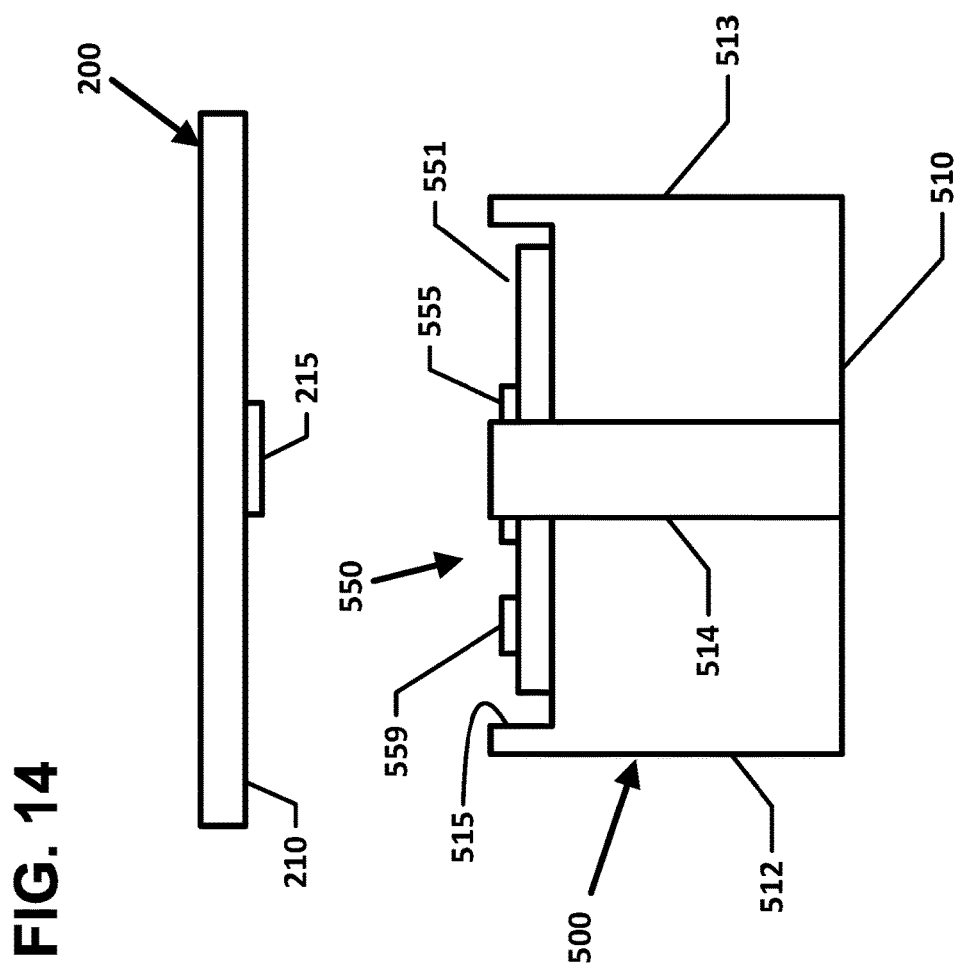
FIG. 14 is a schematic view of another example connection module defining an SC adapter.

FIG. 14 illustrates another example connection module 500 suitable for installation at the system circuit board arrangement 200. The connection module 500 includes a module body 510 defining a first port 512 and a second port 513. In certain examples, the module body 510 can include a plurality of port pairs. Each port pair 512, 513 align optical fibers received at the ports 512, 513 to aid in coupling the optical fibers. In certain implementations, the module body 510 includes outwardly extending flanges 514 that facilitate mounting of the module body 510 to a panel, bulkhead, tray, or other such structure. In an example, the ports 512, 513 of the module body 510 are configured to receive SC optical connectors.

The module body 510 defines an open first end 515 extending between the ports 512, 513. In the example shown, the open first end 515 is an open top of the module body 510. A module circuit board arrangement 550 is coupled to the module body 510 to provide an MRI contact set to the first port 512. For example, the module circuit board arrangement 550 may be disposed at the open first end 515 of the module body 510. In certain examples, the module circuit board arrangement 550 is recessed within the open first end 515 of the module body 510.

In certain example, the module circuit board arrangement 550 also provides an MRI contact set to the second port 513. In other implementations, MRI contact sets can be disposed at any desired configuration of ports. The module circuit board arrangement 550 includes a module controller 559 that manages information obtained using the MRI contact set and a circuit board connector 555 that mates with a host circuit board connector 215 disposed on a host circuit board 210. In an example, the module circuit board arrangement 550 including the circuit board connector 555 is recessed within the open first end 515 of the module body 510.

The above specification, examples and data provide a complete description of the manufacture and use of the invention. Since many embodiments of the invention can be made without departing from the spirit and scope of the invention, the invention resides in the claims hereinafter appended.

What is claimed is:

1. A connection module configured to be installed at equipment including a system circuit board having at least one circuit board connector, the connection module comprising:
    a module body defining a first connection port configured to receive a plug connector;
    a media reading interface arrangement disposed within the module body, the media reading interface including a contact member that extends into the first connection port to contact any plug connector received at the connection port; and
    an externally-facing connector disposed within an outer peripheral boundary of the module body, the externally-facing connector being electrically connected to the media reading interface.

2. The connection module of claim 1, wherein the first connection port is an optical connection port configured to receive a fiber optic plug connector.

3. The connection module of claim 1, wherein the first connection port is an electrical connection port configured to receive an electrical plug connector.

4. The connection module of claim 1, wherein the contact member is one of a plurality of contact members of the media reading interface.

5. The connection module of claim 4, wherein the contact members are held together by a contact set body.

6. The connection module of claim 5, wherein the contact set body is overmolded around the contact members.

7. The connection module of claim 4, wherein the contact members are mounted to a circuit board disposed within the outer peripheral boundary of the module body.

8. The connection module of claim 7, wherein the externally-facing connector is mounted to an outwardly-facing surface of the circuit board.

9. The connection module of claim 8, wherein the contact members are mounted to an inwardly-facing surface of the circuit board.

10. The connection module of claim 7, further comprising a module controller mounted to the circuit board and electrically connected to the media reading interface arrangement.

11. The connection module of claim 10, wherein the module controller is mounted to an outwardly-facing surface of the circuit board.

12. The connection module of claim 7, wherein the module body defines a recessed surface within an open end of the module body, the recessed surface extends partially across the open end without blocking external access to the first port through the open end, the circuit board seats on the recessed surface.

13. The connection module of claim 1, wherein the contact member is mounted to a circuit board disposed within the outer peripheral boundary of the module body.

14. The connection module of claim 13, wherein the contact member is mounted to an inwardly-facing surface of the circuit board.

15. The connection module of claim 14, wherein the externally-facing connector is mounted to an outwardly-facing surface of the circuit board.

16. The connection module of claim 15, further comprising a module controller mounted to the circuit board and electrically connected to the media reading interface arrangement.

17. The connection module of claim 16, wherein the module controller is mounted to an outwardly-facing surface of the circuit board.

18. The connection module of claim 16, wherein the module body defines a recessed surface within an open end of the module body, the recessed surface extends partially across the open end without blocking external access to the first port through the open end, the circuit board seats on the recessed surface.

19. The connection module of claim 1, wherein a connector insertion axis of the externally-facing connector is generally orthogonal to a plug insertion axis of the first port.

20. The connection module of claim 1, wherein the first port is one of a plurality of ports defined by the module body.

* * * * *